(12) United States Patent
Perlo et al.

(10) Patent No.: US 7,018,261 B2
(45) Date of Patent: Mar. 28, 2006

(54) METHOD FOR PRODUCING AN INCANDESCENT LIGHT SOURCE AND LIGHT SOURCE OBTAINED ACCORDING TO SUCH METHOD

(75) Inventors: Piero Perlo, Sommariva Bosco (IT); Bartolomeo Pairetti, Barge (IT); Antonino Veca, Casalborgone (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 0 days.

(21) Appl. No.: 10/392,813

(22) Filed: Mar. 21, 2003

(65) Prior Publication Data
US 2003/0227243 A1    Dec. 11, 2003

(30) Foreign Application Priority Data
Mar. 22, 2002  (IT)  ............... TO2002A0256

(51) Int. Cl.
*H01K 1/02*   (2006.01)
*H01K 1/20*   (2006.01)
*H01J 9/04*   (2006.01)

(52) U.S. Cl. ............ 445/48; 445/27; 313/316; 313/272

(58) Field of Classification Search .......... 445/48, 445/27, 35, 25; 264/29.2; 427/111; 313/316, 313/271–272
See application file for complete search history.

(56) References Cited

U.S. PATENT DOCUMENTS

2004/0051432 A1*   3/2004   Jiang et al. ............... 313/311

* cited by examiner

*Primary Examiner*—Karabi Guharay
(74) *Attorney, Agent, or Firm*—Sughrue Mion, PLLC

(57) ABSTRACT

A method is described for producing a light source comprising a matrix of micro-filaments able to emit light by incandescence when powered by an electrical current. According to the invention, on the matrix electrical and/or mechanical connections are obtained by means of an agglomeration of carbon nanotubes at least partially ordered with respect to each other. The matrix can be formed extending a single uninterrupted wire, some segments whereof mutually cross.

19 Claims, 4 Drawing Sheets

METHOD FOR PRODUCING AN INCANDESCENT LIGHT SOURCE AND LIGHT SOURCE OBTAINED ACCORDING TO SUCH METHOD

BACKGROUND OF THE INVENTION

The present invention relates to a method for producing an incandescent light source and a light source obtained according to such method.

The first working step followed for purposes of producing filaments for incandescent light sources typically consists of preparing a mixture of tungsten and metallic additives, which is subsequently sintered in the form of bars.

The bars thus obtained are then subjected to hammering and drawing with successive passages, until obtaining a continuous wire with the desired diameter; said wire is subsequently wound in a spiral and cut to the required length to be ready, after a stabilising heat treatment, to be mounted onto a respective support to be inserted in the light source.

In the case of common incandescent lamps, the filament is maintained in position thanks to respective end conductors and intermediate hooks; the conductors serve both as supports and to carry electrical power to the filament, and for this reason they are connected to the base of the lamp; the hooks instead serve solely as supports. The electrical connections between the filament and the conductors are mainly obtained by soldering, for instance by means of capacitive discharge, or by folding and upsetting the conductor on the filament. Since the hooks do not have to provide electrical contact, they are generally folded in loops, through which the filament passes.

Other types of light sources provide for the use of matrices of filaments able to emit light by incandescence when powered by an electrical current, as well as the use of electronic control means for the lighting of some or all filaments in the matrix.

The individual filaments can be obtained with multiple coupled filaments (two, three, or more), or with a single filament wound in a simple or multiple spiral or, in the simplest case, they can consist of a segment of individual filament. The aforesaid matrix consists of a quantity of filaments connected in various ways, for instance in series, in parallel, in series-parallel, in parallel-series, in a net configuration.

Regardless of the chosen configuration, the number of the filament in a matrix can be high, where the respective arrangement presupposes connections between the power supply conductors and the filaments, and/or connections between the filaments, and/or connections of any conductors or hooks intermediate to the filaments.

One of the reasons limiting the wider use of light sources with filament matrices is currently constituted by the difficulty in obtaining the aforesaid connection in a simple, effective and economical manner.

Another difficulty to overcome is given by the fact that, especially when the number of filaments in a matrix is high, there are manufacturing problems linked to their positioning.

SUMMARY OF THE INVENTION

In general terms, the present invention is aimed at solving the aforesaid drawbacks.

Given that the dimensions and number of connections have considerable influence on the quantity of heat that is dissipated, and hence on the efficiency of the filament matrix, a first object of the present invention is to indicate a method that allows to obtain connections having extremely reduced dimensions.

Given that the operating temperature of the connections of the filament matrices is very high (~2500° C.), a second aim of the present invention is to indicate a method that allows to obtain connections with an adequate ability to withstand such temperatures, without the production of polluting gases as a result of the operating temperature of the connections.

A third object of the invention is to indicate a method that, even in the presence of highly complex filament matrices, allows to obtain the connections in a simple manner, in order to contain production costs.

A fourth object of the invention is to indicate a method for obtaining filament matrices having very low manufacturing defect rate, in order to limit production waste.

The aforesaid objects are achieved, according to the present invention, by a method for producing an incandescent light source comprising a complex or matrix of micro-filaments able to emit light by incandescence when they are powered by an electrical current, the method comprising the production on the micro-filament complex, of one or more electrical and/or mechanical connections, characterised in that the connection or connections are obtained using an agglomeration of carbon nanotubes at least partially ordered with respect to each other.

An additional object of the invention is to indicate a method that allows to obtain in simple fashion the positioning of the filaments during the manufacturing phase.

Said additional object is achieved, according to a further aspect of the invention, by a method in which the micro-filament matrix is formed extending a single uninterrupted wire constituted by a material selected among tungsten or tungsten-based metallic alloys along a complex path defined by a plurality of positioning elements arranged in remote position from each other, the path being such that segments of the uninterrupted wire that extend from different positioning elements are mutually crossed.

Preferred embodiments of the invention are contained in the accompanying claims, which form an integral part of the present description.

BRIEF DESCRIPTION OF THE DRAWINGS

Further objects, characteristics and advantages of the present invention shall become readily apparent from the following description with reference to the accompanying drawings, provided purely by way of non limiting example, in which.

DETAILED DESCRIPTION OF THE INVENTION

Figure 1:
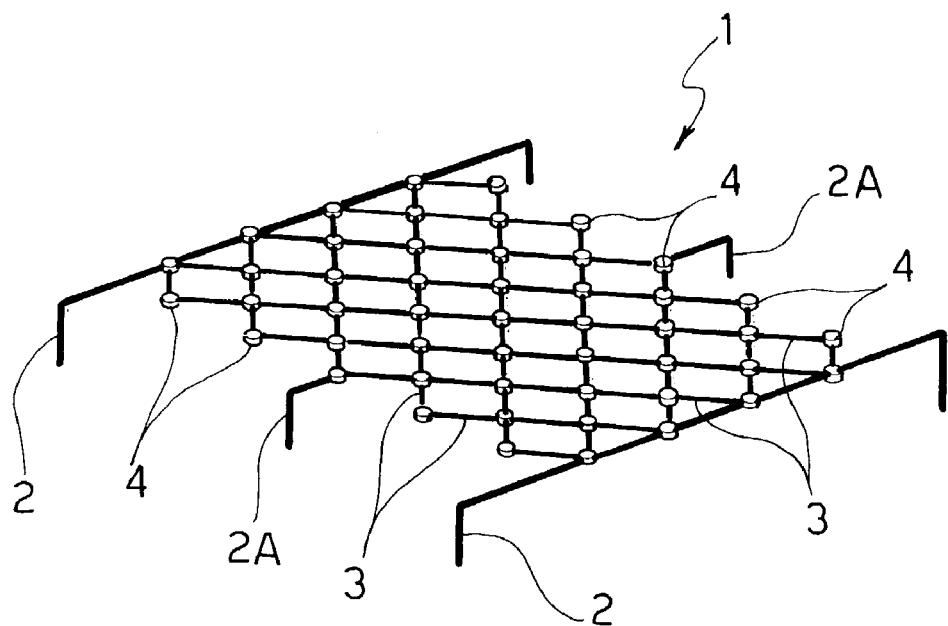
FIG. 1 is a perspective view of a matrix of incandescence filaments of a light source obtained in accordance with the teachings of the present invention.

In FIG. 1, the reference number globally designates a filament matrix produced in accordance with the teaching of the present invention.

The matrix 1 comprises two lateral power supply conductors 2 made of metallic material and a plurality of micro-filaments 3, where the term "micro-filaments" means individual pieces of filament that emit light when an appropriate electrical current flows through them, reaching a temperature of about 2800° K.

The various micro-filaments 3 are arranged according to a "net" configuration, and are then mechanically and electrically connected to each other as well as to the conductors 2; the reference number 2A designates hooks for the positioning and support of the matrix 1, also connected to some micro-filaments 3. For this purpose, also with reference to FIG. 2, the reference number 4 designates the connections between some micro-filaments 3.

The elementary filament of the matrix 1 can be in different forms: individual wire, multiple wires coupled in parallel, wire wound in a spiral.

In an advantageous embodiment, the filament system of the matrix 1 can be obtained in the aforesaid forms using a single uninterrupted wire, which allows considerably to simplify the production process, whilst reducing the defect rate of the final product.

The materials used to obtain the aforesaid wire can be tungsten, a rhenium-tungsten or other alloys with tungsten; the rhenium-tungsten alloy is particularly indicated because it improves the working live of the filament and its mechanical strength.

Figure 3:
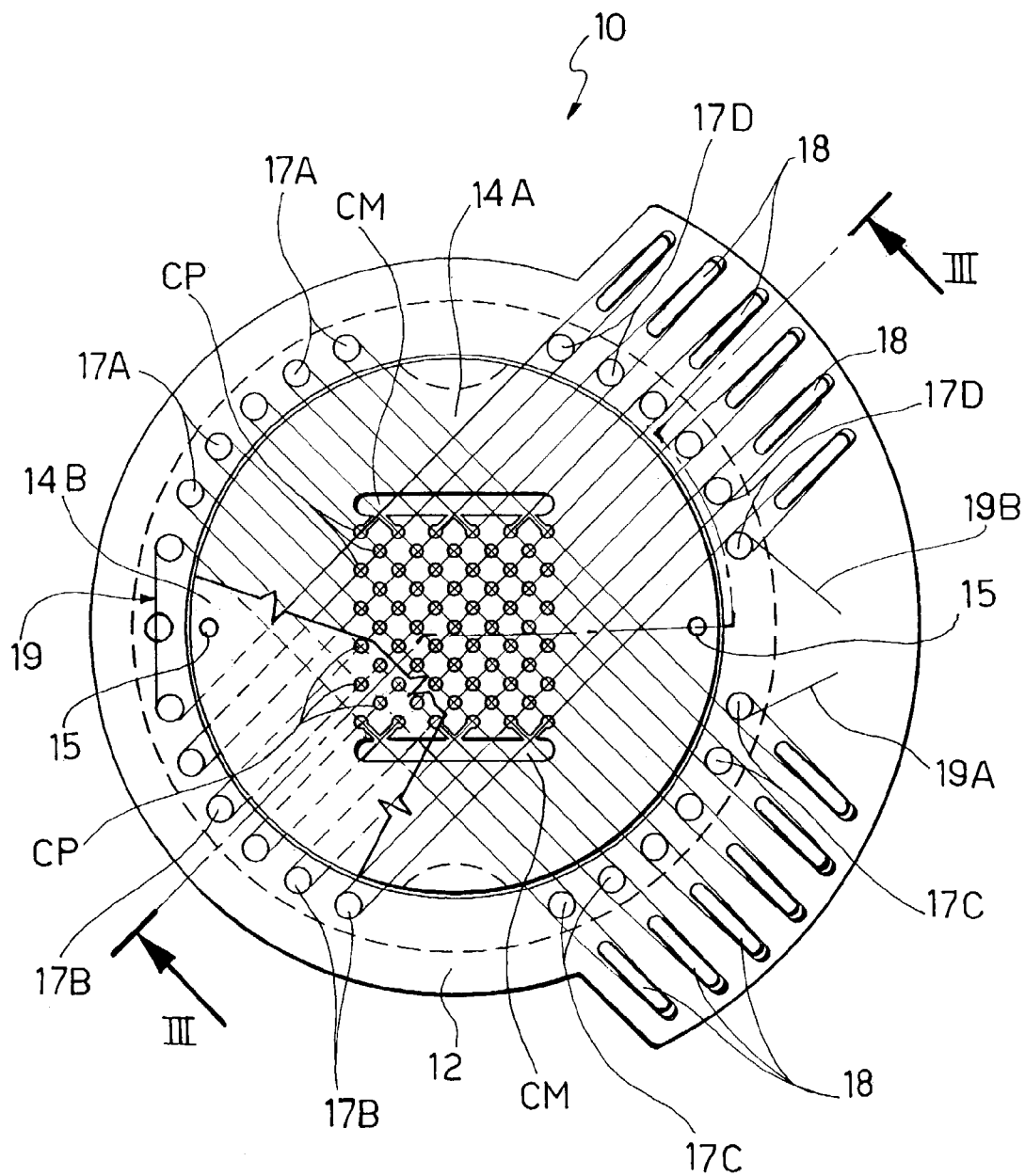
FIG. 3 is a plan and partially cut-off view of a tool used to produce the matrix of FIG. 1.
Figure 4:
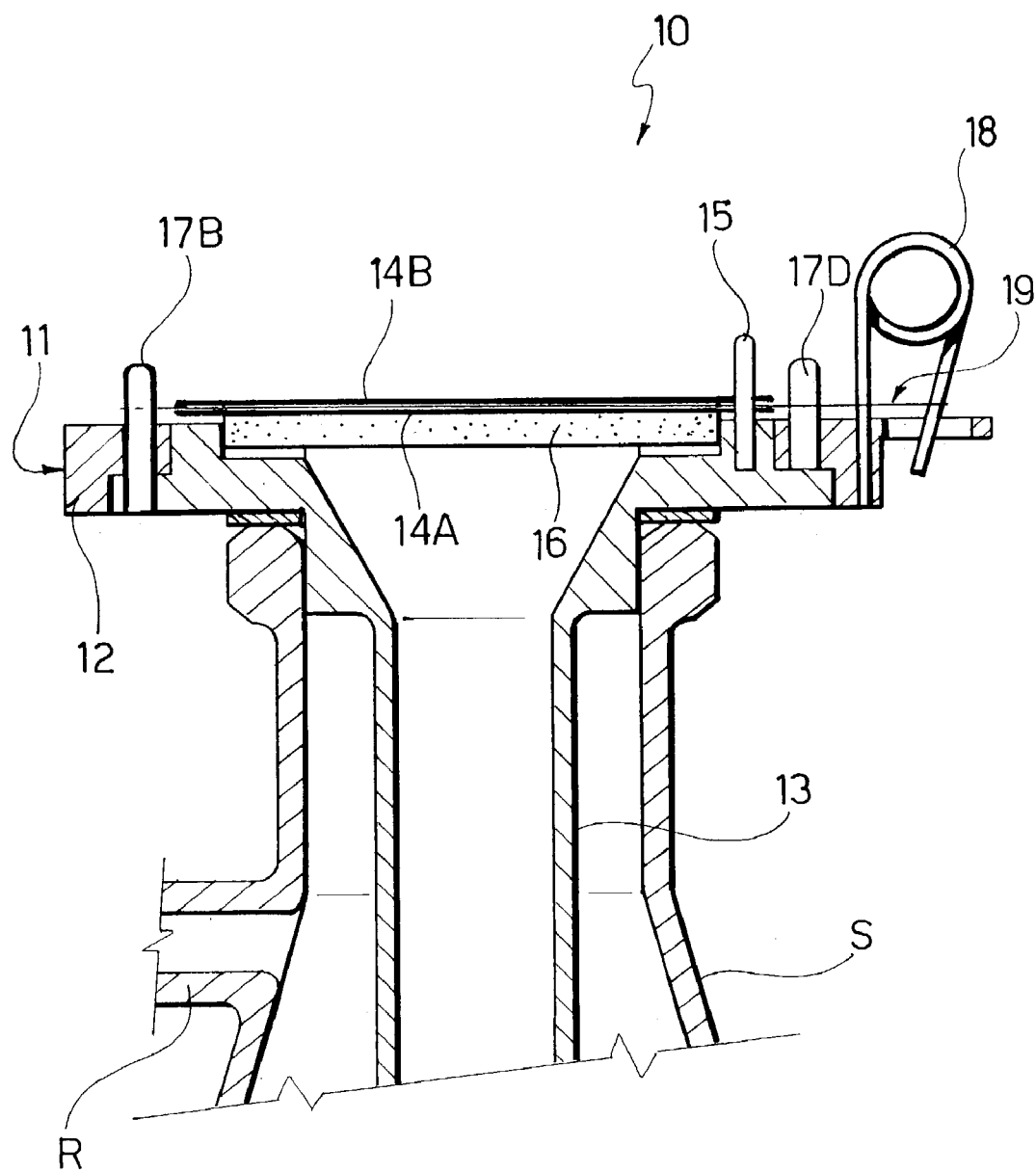
FIG. 4 is a lateral section according to the line III—III of FIG. 3.

For the purposes of producing the matrix 1 by means of a single starting wire, an appropriate equipment is used, globally designated as 10 in FIGS. 3 and 4.

The equipment 10 has a main body 11, substantially T-shaped, having a planar upper portion 12, centrally opened, wherefrom departs downwards a lower portion 13 shaped as a conduit, which is coupled in sealed fashion onto a respective support S.

The central area of the upper portion 12 is provided for housing a pair of superposed planar elements, designated as 14A and 14B; for this purpose, on opposite parts of the upper portion 12 are provided respective pins 15, whereon are fitted the two planar elements 14A and 14B, with an operative sequence that will be described below.

Inferiorly to the planar element 14A, in a respective seat defined in correspondence with the central opening of the upper portion 12, a support 16 is provided.

In the preferred embodiment of the invention, the support 16 constitutes, together with the planar elements 14A and 14B, a mould used for purposes of obtaining the connections 4, as shall become readily apparent below. To this end, within the two planar elements 14A and 14B are defined arrays of through cavities CP, positioned between two larger cavities CM, wherein the conductors 2 are destined to be positioned.

In the peripheral area of the upper portion 12, outside the positioning area of the planar elements 14A and 14B are positioned in pairs four groups of pins 17A, 17B, 17C and 17D, used for positioning a single tungsten-based wire; to the pins 17C and 17D of two of said groups are aligned respective elastic tensioning elements 18, for instance in the form of springs, known in themselves.

As stated, for the purposes of producing the matrix 1 a single tungsten-based wire is used, designated as 19, whose two ends are designated 19A and 19B in FIG. 4.

For this purpose, on the portion 12 of the body 11 is positioned the support or filter 16 and thereon the planar element 14A.

The wire 19 is then unwound prevalently between the positioning pins 17A, 17B and the tensioning elements 18, in such a way as to form the pattern visible in the figure.

The pattern is thus arranged substantially on a single plane and in such a way that the crossings between the micro-filaments are in correspondence with the cavities CP of the planar element 14A; in the respective cavities CM can instead be positioned the conductors 2; in the cavities CM which are in correspondence with some of the crossings at the lateral ends of the pattern of filaments can be positioned the hooks 2A.

Figure 5:
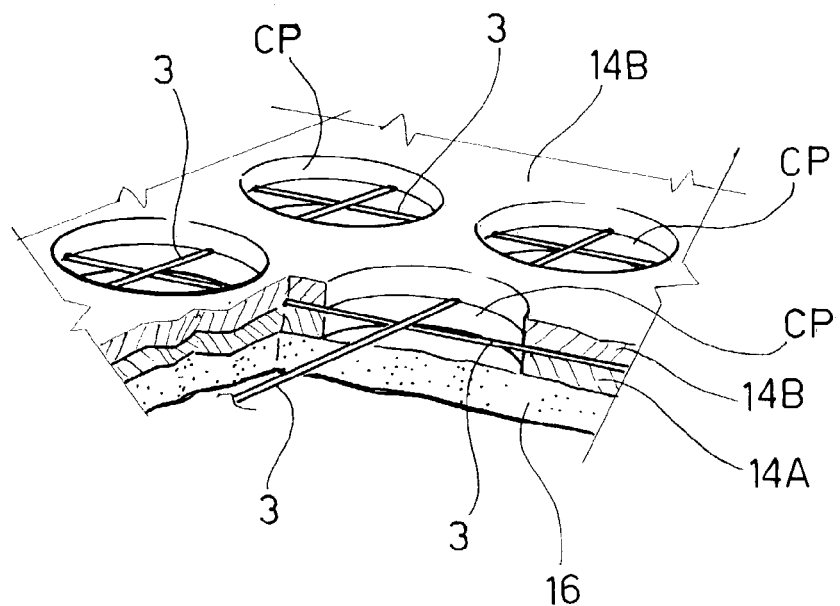
FIG. 5 is a perspective view of a portion of the tool of FIG. 3, during its employment.
Figure 6:
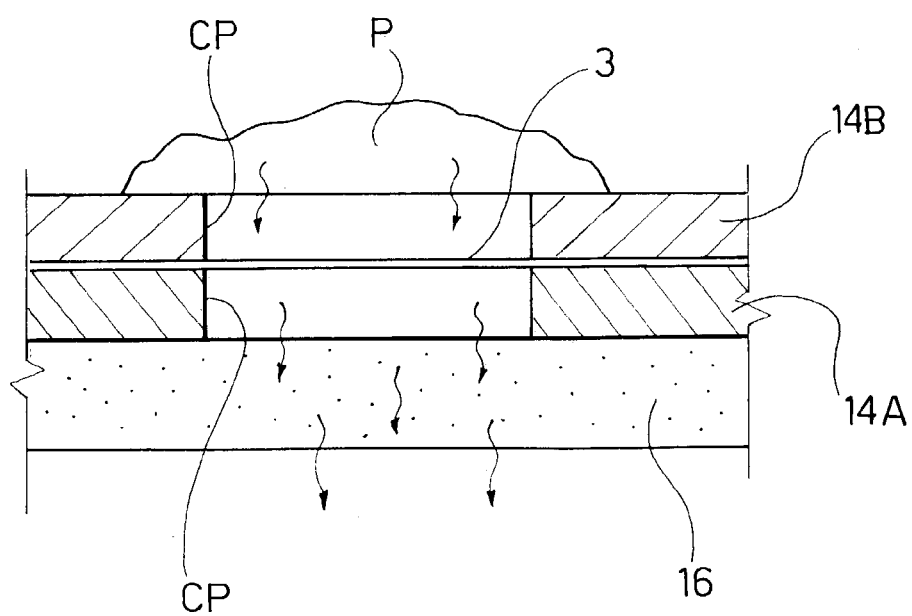
FIG. 6 is a lateral section of the tool of FIG. 3, during its employment.

To the equipment 10 is then also associated the planar element 14B, the micro-filament pattern thus being interposed between the two elements 14A and 14B, with the crossings positioned in correspondence with the through cavities CP of the elements 14A and 14B, as noted in FIG. 5 (note than in said figure, as in FIG. 6, the thickness of the element 14A and 14B is increased for the sake of greater clarity of representation).

Figure 2:
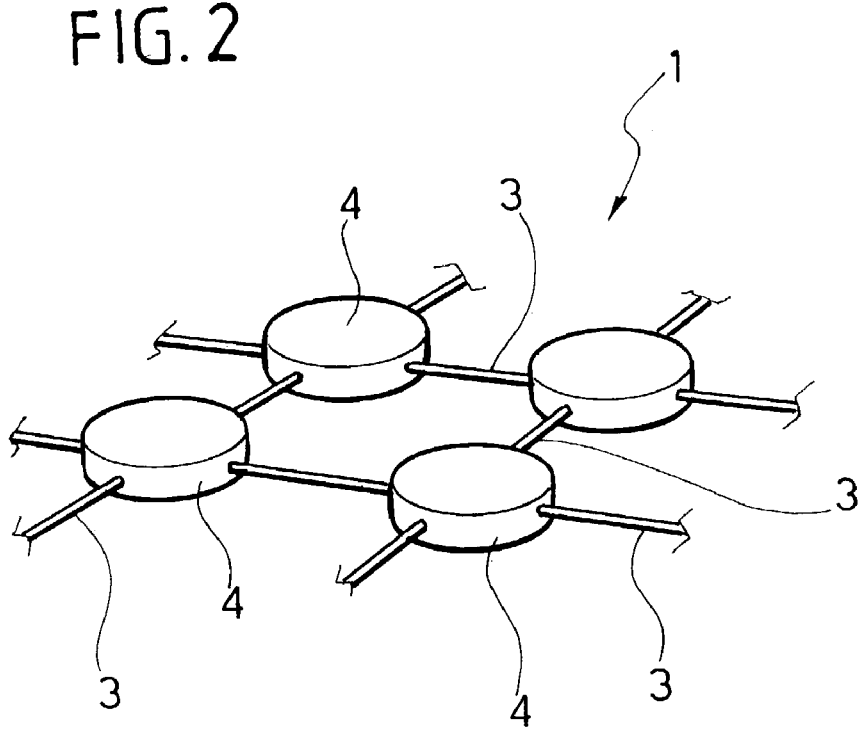
FIG. 2 is a perspective view of a detail of a part of the matrix of FIG. 1, in enlarged scale.

Into the cavities CP and CM is then poured the material used to obtain the connections 4 of the matrix 1 of FIGS. 1 and 2; at the end of said operation of moulding the connections 4, the matrix 1 now formed is freed from the equipment 10 and by the excess segments of tungsten wire, and for the latter operation one can for instance use laser cutting.

As is readily apparent, use of the equipment 10 allows to obtain the matrix 1 of micro-filaments 3 starting from a continuous wire, with evident advantages in terms of simplicity and regularity of positioning of the filaments themselves.

According to an important aspect of the present invention, for purposes of obtaining the connections 4 carbon nanotubes are used: this is one of the most stable allotropic forms of carbon.

Carbon nanotubes can be depicted as a cylindrical structure constituted by one or more graphite sheets wound about a central axis. At the ends, the walls of the tube are curved until they close in on themselves forming a sort of "cap" with conical or semi-spherical shape, with molecular geometry similar to those of fullerenes.

The diameter of carbon nanotubes ranges from 1 to 50 nm whilst their length can reach a few tens of microns; they have exceptional mechanical, electrical and thermal properties: they are stronger and lighter than steel and they conduct electricity like metals do, with high ultimate tensile stress (~100 Gpa), very high Young module (~1.8 Tpa), low density (~1.3 g/cm$^3$), high electrical conductivity (~10e+06 ohm−1.m−1), high thermal conductivity(~2000 W·m−1·K−1).

For an agglomeration of carbon nanotubes to be provided with high mechanical strength, the nanotubes must be mutually aligned.

However, due to the high inter-tube cohesion forces due to electrostatic interactions, carbon nanotubes are usually in aggregate but disorderly form.

A possible way to solve this problem is to produce the carbon nanotubes already mutually aligned, using chemical deposition techniques. While such processes are applicable, they are costly; in the preferred embodiment of the invention, therefore, it is proposed to start from the same disorderly nanotube aggregates, in the form of powder.

The preparation of structured material from nanotubes requires said aggregates to be initially destroyed, and then to allow the nanotubes to align themselves partially or total.

To this end, in accordance with the method according to the invention, a surface-active solution is prepared, within which the carbon nanotubes are dispersed by agitation. The suspension thereby obtained is preferably subjected to an ultrasound treatment, for a time interval considered adequate to favour the disaggregation of the nanotube agglomerates.

In this phase, the surface-active compound is adsorbed on the walls of the nanotubes, covering and forming a molecular layer around them which favours the disaggregation of the agglomerations by effect of the suppression of the electrostatic attraction forces between nanotube and nanotube.

The suspension preparation step is carried out in manners that are clear to those versed in the art, taking into account the solution properties of carbon nanotubes and the ternary phase diagram nanotubes/water/surface-active compound.

An excess of surface-active compound would result in the formation of agglomerations of surface-active compound molecules (micelles), thereby reducing the adsorption effect on the nanotube walls; surface-active/surface-active interactions would be privileged over surface-active/nanotube interactions, thus leaving the nanotube agglomerations unaltered. Conversely, small quantities of surface-active compound do not cause the desired effect of coating individual nanotube molecules.

Essentially, therefore, the nanotube suspension should be handled with care, avoiding any dilution that would result in imbalances.

Once the time required to achieve the disaggregation of the nanotube agglomerations has elapsed, an adequate quantity of suspension is placed in the mould formed by the planar elements 14A, 14B and by the support 15, which here serves the function of porous filter, and to this end is made for instance of Teflon or polycarbonate.

The shape of the aforesaid mould, or rather of the various cavities CP, determines the shape of the connections 4 and contains, as stated, the portions of micro-filaments 3, of the conductors 2 and of any hooks 2A that are incorporated in the matrix 1.

In all the various cavities CP (and CM), which are as in FIG. 5, is then placed the suspension of the disaggregated nanotubes in the surface-active compound, which is substantially in the form of a paste, designated as P in FIG. 6. As is readily apparent, an advantage of the technique proposed herein is that all connections 4 can be executed in a single operation.

The suspension contained in the mould formed by the planar elements 14A, 14B and by the filter 15 is then filtered. This is preferably accomplished by creating a vacuum below the filter 15, i.e. in the lower conduit-like portion 13 of the body of the equipment 10, visible in FIG. 4, for instance by aspiration from a fitting R of the support S.

Filtering is then followed by a series of washings of the mould, first with water and then with methyl alcohol, to eliminate all traces of surface-active compound; the solid part left inside the cavity CP, CM of the mould is then dried, thereby obtaining a compact and strong mass of nanotubes, which achieves the connections 4.

In this regard it should be noted that the washing and drying steps are characterised by the directionality of the flow of the fluid used (liquid and air) as highlighted by the undulated vertical arrows in FIG. 6. The nanotubes are crushed by the pressure of the fluid, in order to generate inter-tube cohesion forces favouring their re-aggregation in orderly fashion, i.e. mutually aligned or parallel. It should be noted that directionality of flow is important to obtain the mutual alignment of the nanotubes, necessary condition to provide mechanical strength to the agglomeration.

This purpose is served by the filtering element 15, which constitutes in fact the lower wall of the mould, and by an adequate pressure differential to initiate the flow.

Should it be necessary, it is possible to operate with a non optimal suspension, thereby also obtaining an only partial alignment of the nanotubes inside the connections 4. Although the partial alignment of the nanotubes confers reduced strength, said strength is nonetheless sufficient for the mechanical stresses typical of the connections of a filament matrix of the type examined herein. This consideration therefore allows to choose a compromise that can simplify the production steps, also in terms of time.

From the above description, the characteristics of the present invention are readily apparent, as are its advantages. Among them, it should be stressed that use of carbon nanotubes with the method according to the invention allows:

to achieve connections 4 of extremely reduced dimensions, with evident benefits in terms of quantity of heat dissipated and matrix efficiency;

to obtain connections 4 able to withstand high operating temperatures, without the production of polluting gases;

to achieve the connections 4 simultaneously, in simple and rapid fashion and with low defect rate, with consequent reduction of the production costs.

Obtaining the matrix 1 starting from a single base wire, by means of the equipment based on opposite positioning pins and tensioning elements, allows to obtain in simple fashion the positioning of the filaments during production.

Naturally, without changing the principle of the invention, the construction details and the embodiments may vary from what is described and illustrated purely by way of example herein.

The conductors 2 and any positioning hooks 2A, instead of being configured as distinct components to be connected to the matrix, could be obtained directly from carbon nanotubes, in the course of the production of the connections 4; in this case, in the cavity CM of the mould and in those that may be provided for the hooks, only the suspension P would be present, then subjected to filtering, washing and drying as described above, in order to obtain the conductors and the hooks directly.

The shape of the cavities CP could be different from those illustrated by way of example, as it may be variable according to constructive requirements; the same holds true for the cavities CM and for the additional cavities for any hooks for positioning the matrix.

The equipment 10 could be conceived in such a way as to allow moving or in any case adjusting the position of the pins 17 and of the tensioning elements 18, and to the upper portion 12 of the body 11 could be associated planar elements 14B and 14B bearing arrays of cavities CP, CM with different shapes, in order to obtain various pattern configurations.

In accordance with possible variations in the implementation of the method according to the invention, the alignment of the nanotubes necessary to obtain the material used for the connections 4 can be obtained with other techniques, for instance based on the use of electrical fields or magnetic fields. In particular, manners of aligning the nanotubes alternative to the one described in detail above can be all those described in WO-A-01 30694, whose teachings in this regard are to be considered incorporated herein by reference.

The single wire could be arranged to travel even several times over the same path defined by the positioning pins 17A–17D and by the tensioning elements 18, in which case the micro-filaments 3 would be formed by a skein-like bundle of filaments; the single wire could also have, along its development, spiral segments alternating with rectilinear segments, or be entirely in the form of a continuous spiral.

The use of carbon nanotubes in the manner described and in the manners mentioned herein can be advantageously applied also for purposes of obtaining connections between mutually independent microfilaments, i.e. not formed starting from a single uninterrupted base wire.

What is claimed is:

1. A method for producing a light source comprising a complex of micro-filaments able to emit light by incandescence when powered by an electrical current, the method comprising the steps of:
    forming the complex of micro-filaments by a first material, and
    achieving on the complex of micro-filaments one or more electrical and/or mechanical connections using a second material,
    wherein the connection or connections are obtained using an agglomeration of carbon nanotubes at least partially ordered with respect to each other.

2. A method as claimed in claim 1, wherein the connection or connections comprise at least one of
    a connection between two micro-filaments in the complex of micro-filaments,
    a connection between a micro-filament in the complex of micro-filaments and a conductor for supplying power to the complex of micro-filaments, and
    a connection between a micro-filament in the complex of micro-filaments and a positioning element or support of the complex of micro-filaments.

3. A method as claimed in claim 2, wherein at least one of said conductor and said positioning or support element is entirely obtained with said agglomeration.

4. A method as claimed in claim 1, wherein the carbon nanotubes are at least partially ordered or aligned with each other before or during the production of the connection or connections.

5. A method as claimed in claim 4, wherein the carbon nanotubes are ordered or aligned by means of application of an electric or magnetic field.

6. A method as claimed in claim 1, wherein the connection or connections are obtained by means of a moulding operation.

7. A method as claimed in claim 6, wherein the moulding operation comprises a prior dispersion of aggregations of disordered carbon nanotubes in a surface-active compound solution.

8. A method as claimed in claim 7, wherein a suspension formed by the surface-active compound and by the aggregations of disordered carbon nanotubes is subjected to an ultrasound treatment, to favor the disaggregation of the aggregations.

9. A method as claimed in claim 7, wherein a suspension formed by the surface-active compound and by the dispersed aggregations of nanotubes is placed in a mould.

10. A method as claimed in claim 9, wherein the suspension contained in the mould is subjected to filtration.

11. A method as claimed in claim 10, wherein the nanotube aggregation that remains inside the mould is subjected, after filtration, to a series of washings, to eliminate or otherwise reduce residues of the surface-active compound.

12. A method as claimed in claim 11, wherein the solid part of the aggregation that remains inside the mould following the washings is dried, to obtain a mass of nanotubes that produces the connections.

13. A method as claimed in claim 10, wherein the moulding operation comprises arrangement of said complex of micro-filaments between an upper planar element and a lower planar element provided with respective through cavities, the through cavities of the two planar elements being substantially aligned axially to each other and the filtering element being positioned below the lower planar element, and where in correspondence with the aligned through cavities are positioned crossings between the filaments in which the connections are to be achieved.

14. A method as claimed in claim 1, wherein the complex of micro-filaments is obtained from a single uninterrupted wire constituted by a material of tungsten or a tungsten-based metallic alloys.

15. A method as claimed in claim 14 wherein the single uninterrupted wire is arranged to travel several times over the same path, the micro-filaments being formed by a skein-like bundle of filaments.

16. The method as claimed in claim 1, wherein the micro-filaments in the complex of micro-filaments are arranged to form a matrix.

17. A method for producing a light source comprising a complex of micro-filaments able to emit light by incandescence when powered by an electrical current, the method comprising the steps of:
    forming the complex of micro-filaments, and
    achieving on the complex of micro-filaments one or more electrical and/or mechanical connections,
    wherein the connection or connections are obtained using an agglomeration of carbon nanotubes at least partially ordered with respect to each other, and by means of a moulding operation.

18. A method for producing a light source comprising a complex of micro-filaments able to emit light by incandescence when powered by an electrical current, the method comprising the steps of:
    forming the complex of micro-filaments, and
    achieving on the complex of micro-filaments one or more electrical and/or mechanical connections,
    wherein the connection or connections are obtained using an agglomeration of carbon nanotubes at least partially ordered with respect to each other, and
    wherein the carbon nanotubes are ordered or aligned by means of application of an electric or magnetic field.

19. A method for producing a light source comprising a complex of micro-filaments able to emit light by incandescence when powered by an electrical current, the method comprising the steps of:
    forming the complex of micro-filaments, and
    achieving on the complex of micro-filaments one or more electrical and/or mechanical connections,
    wherein the complex of micro-filaments is obtained from a single uninterrupted wire constituted by a material of tungsten or a tungsten-based metallic alloy, and
    wherein the connection or connections are obtained using an agglomeration of carbon nanotubes at least partially ordered with respect to each other.

* * * * *